United States Patent
Chow et al.

(10) Patent No.: US 10,593,216 B2
(45) Date of Patent: Mar. 17, 2020

(54) METHODS AND SYSTEMS FOR MULTIPLE DRONE DELIVERY SYSTEM WITH IN-FLIGHT HANDOFF

(71) Applicant: INTERNATIONAL BUSINESS MACHINES CORPORATION, Armonk, NY (US)

(72) Inventors: Stephen Chow, Plano, TX (US); Grant D. Miller, Arvada, CO (US); Nader M. Nassar, Yorktown Heights, NY (US); Richard J. Newhook, Egg Harbor City, NJ (US); Erich D. Walls, Valparaiso, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 144 days.

(21) Appl. No.: 15/465,916

(22) Filed: Mar. 22, 2017

(65) Prior Publication Data

US 2018/0276993 A1 Sep. 27, 2018

(51) Int. Cl.
*G08G 5/00* (2006.01)
*B64C 39/02* (2006.01)

(52) U.S. Cl.
CPC ......... *G08G 5/0043* (2013.01); *B64C 39/024* (2013.01); *G08G 5/0013* (2013.01); *G08G 5/0026* (2013.01); *G08G 5/0034* (2013.01); *G08G 5/0069* (2013.01); *B64C 2201/027* (2013.01); *B64C 2201/108* (2013.01); *B64C 2201/127* (2013.01); *B64C 2201/128* (2013.01); *B64C 2201/143* (2013.01); *B64C 2201/182* (2013.01)

(58) Field of Classification Search
None
See application file for complete search history.

(56) References Cited

U.S. PATENT DOCUMENTS

| 9,305,280 | B1 | | 4/2016 | Berg et al. | |
|---|---|---|---|---|---|
| 9,387,928 | B1 | * | 7/2016 | Gentry | B64C 39/024 |
| 9,561,852 | B1 | * | 2/2017 | Beaman | B64D 1/00 |
| 2016/0033966 | A1 | * | 2/2016 | Farris | A47G 29/122 |
| | | | | | 701/15 |
| 2016/0068265 | A1 | | 3/2016 | Hoareau et al. | |
| 2016/0107750 | A1 | | 4/2016 | Yates | |

(Continued)

FOREIGN PATENT DOCUMENTS

WO 2014080386 A2 5/2014

*Primary Examiner* — Thomas G Black
*Assistant Examiner* — Ana D Thomas
(74) *Attorney, Agent, or Firm* — Griffiths & Seaton PLLC

(57) ABSTRACT

Embodiments for managing drones by one or more processors are described. A first aerial drone having a payload coupled thereto is controlled such that the first aerial drone travels from a first location to a second location. A second aerial drone is controlled such that the second aerial drone travels to the second location. While the first aerial drone and the second aerial drone are in flight at the second location, the payload is detached from the first aerial drone and coupled to the second aerial drone. After the payload is detached from the first aerial drone and while the payload is coupled to the second aerial drone, the second aerial drone is controlled such that the second aerial drone travels from the second location to a third location.

21 Claims, 15 Drawing Sheets

(56) References Cited

U.S. PATENT DOCUMENTS

2016/0304217 A1   10/2016  Fisher et al.
2016/0378108 A1*  12/2016  Paczan .................... B64C 37/02
                                                            705/330

* cited by examiner

METHODS AND SYSTEMS FOR MULTIPLE DRONE DELIVERY SYSTEM WITH IN-FLIGHT HANDOFF

BACKGROUND OF THE INVENTION

Field of the Invention

The present invention relates in general to computing systems, and more particularly, to various embodiments for managing multiple drones, such as for transporting items between locations.

Description of the Related Art

One of the problems expected with the practical implementation of drone (e.g., unmanned aerial vehicle (UAV)) based shipping and/or delivery systems is that the current state of the art drones have relatively limited ranges and/or carrying (or payload) capacity. As such, such drone based systems are often envisioned as being utilized in a multi-stage or multi-drone method in which a first drone transports the item(s) being shipped to an intermediate location, where it is retrieved by a second drone which transports the item for the next segment of the delivery/shipping process, and/or in combination with conventional shipping/delivery systems, such as those utilizing larger (e.g., manned) aircraft and/or ground vehicles, when the item needs to be transported long distances.

Although the multi-stage approach has the potential to minimize the need for additional infrastructure (e.g., other vehicles) and human interaction, one potential problem is the availability of appropriate and secure locations where the item(s) could be left by one drone and retrieved by the subsequent drone.

SUMMARY OF THE INVENTION

Various embodiments for managing drones by one or more processors are described. In one embodiment, by way of example only, a method for managing drones, again by one or more processors, is provided. A first aerial drone having a payload coupled thereto is controlled such that the first aerial drone travels from a first location to a second location. A second aerial drone is controlled such that the second aerial drone travels to the second location. While the first aerial drone and the second aerial drone are in flight at the second location, the payload is detached from the first aerial drone and coupled to the second aerial drone. After the payload is detached from the first aerial drone and while the payload is coupled to the second aerial drone, the second aerial drone is controlled such that the second aerial drone travels from the second location to a third location.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
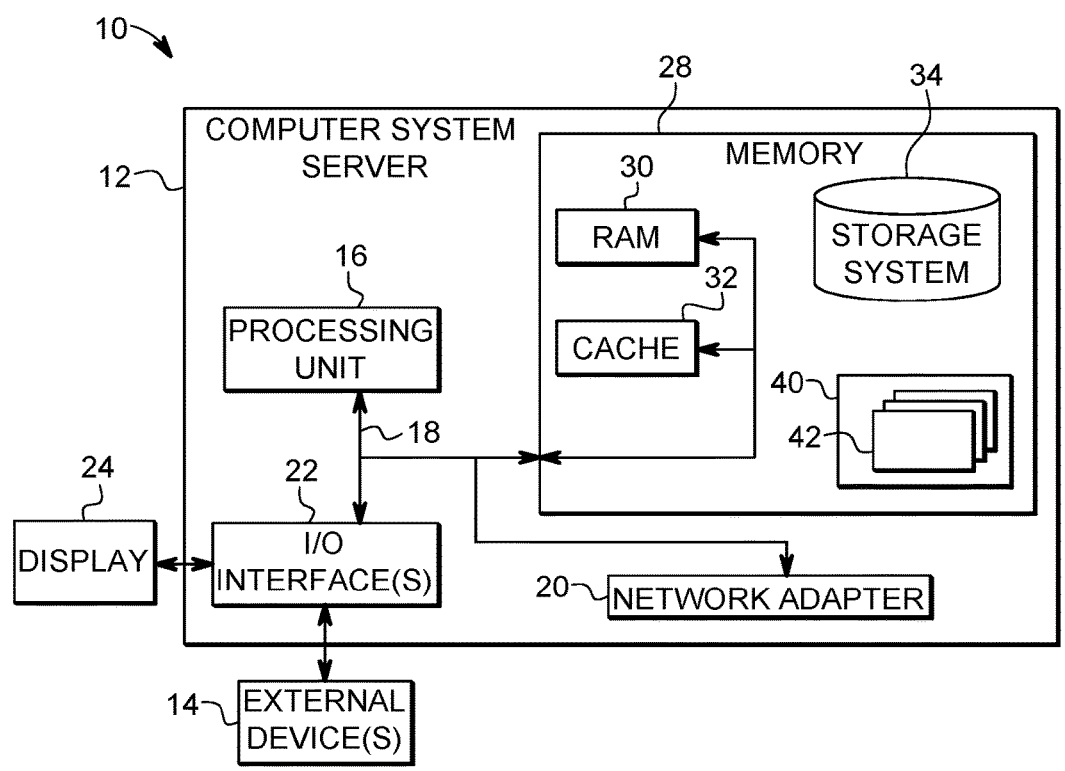
FIG. 1 is a block diagram depicting an exemplary computing node according to an embodiment of the present invention.

As previously indicated, because current drones (e.g., unmanned aerial vehicles (UAVs)) have relatively limited ranges and/or carrying (or payload) capacity, drone based shipping (and/or delivery) systems are often envisioned as being utilized in a multi-stage or multi-drone method in which a first drone transports the item(s) being shipped to an intermediate location, where it is retrieved by a second drone which transports the item for the next segment of the delivery/shipping process, and/or in combination with conventional shipping/delivery systems, such as those utilizing larger (e.g., manned) aircraft and/or ground vehicles, when the item needs to be transported long distances. Although the multi-stage approach has the potential to minimize the need for additional infrastructure (e.g., other vehicles) and human interaction, one potential problem is the availability of appropriate and secure locations where the item(s) could be left by one drone and retrieved by the subsequent drone.

Consider an example in which an item is to be shipped across a relatively large urban area (e.g., 20 miles). Depending on the size and weight of the item, combined with the limited range/payload capacity of current drones, in all likelihood, several drones would have to be used in the shipping/delivery process. A general solution would be to have a first drone retrieve the item (or have the item loaded thereon) at an origination point and transport the item to an intermediate point between the origination point and the destination (or delivery point), where it would be retrieved by a second drone and transported on the next leg of the journey. However, in order for such a system to be implemented, appropriate "drop off/pick up" points would have to be secured (and/or set up and/or approved). Depending on the exact nature of the region in question, doing so may be difficult. For example, if the region is mostly residential, the drop off/pick up points may have to be approved by the individual residents who live at those locations.

In view of the foregoing, a need exists for drone based delivery systems in which multiple drones may be used to transport a single payload (or item) in such a way that the payload is transferred from one drone to the next while minimizing, if not completely eliminating, the need for terrestrial drop off/pick up points.

To address these needs, the methods and systems of some embodiments of the present invention use, for example, multiple individual drones, such as aerial drones (e.g., unmanned aerial vehicles (UAVs)), that are equipped with payload systems (or mechanisms) that allow the payload to be transferred from one drone to the next while both drones are in flight. In other words, in at least some embodiments, neither of the drones nor the payload needs to land/touch ground (or any ground-based structure) while the payload is being transferred from one drone to the next (i.e., during the "handoff" process).

In some embodiments, a first aerial drone having a payload coupled thereto is controlled such that the first aerial drone travels from a first location to a second location. A second aerial drone is controlled such that the second aerial drone travels to the second location. While the first aerial drone and the second aerial drone are in flight at the second location, the payload is detached from the first aerial drone and coupled to the second aerial drone. After the payload is detached from the first aerial drone and while the payload is coupled to the second aerial drone, the second aerial drone is controlled such that the second aerial drone travels from the second location to a third location.

In some embodiments, the payload is coupled to the second aerial drone before the payload is detached from the first aerial drone. As part of, for example, the "handoff" process, at least one of the drones may be controlled such that it performs one or more in-flight rotations about a non-vertical axis (e.g., a substantially horizontal axis). As described in greater detail below, the payload may be coupled to the drones (e.g., the first drone, the second drone, or both) in such a way that the payload is rotatable relative to the drone(s) about an axis that is not orthogonal (or perpendicular) to the non-vertical axis about which the drone(s) performs the rotation(s). For example, the axis about which the payload is rotatable may be substantially parallel to the axis about which the drone(s) performs the rotation(s) (e.g., both axes may be substantially horizontal).

In some embodiments, the rotation(s) of the drones (e.g., as part of the handoff process) includes controlling the second aerial drone such that it performs a first in-flight rotation before the payload is coupled to the second aerial drone and controlling the first aerial drone and the second aerial drone such that the first aerial drone and the second aerial drone simultaneously (and/or jointly) perform a second in-flight rotation after the payload is coupled to the second aerial drone and before the payload is detached from the first aerial drone.

In some embodiments, after the payload is detached from the first aerial drone, the first aerial drone is controlled such that it performs a third in-flight rotation. When the second aerial drone, with the payload attached, reaches the third location, the payload may be detached from the second aerial drone to deliver the payload (and/or the item(s) within).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors therein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a computing device in a drone (e.g., UAV) or a warehouse. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
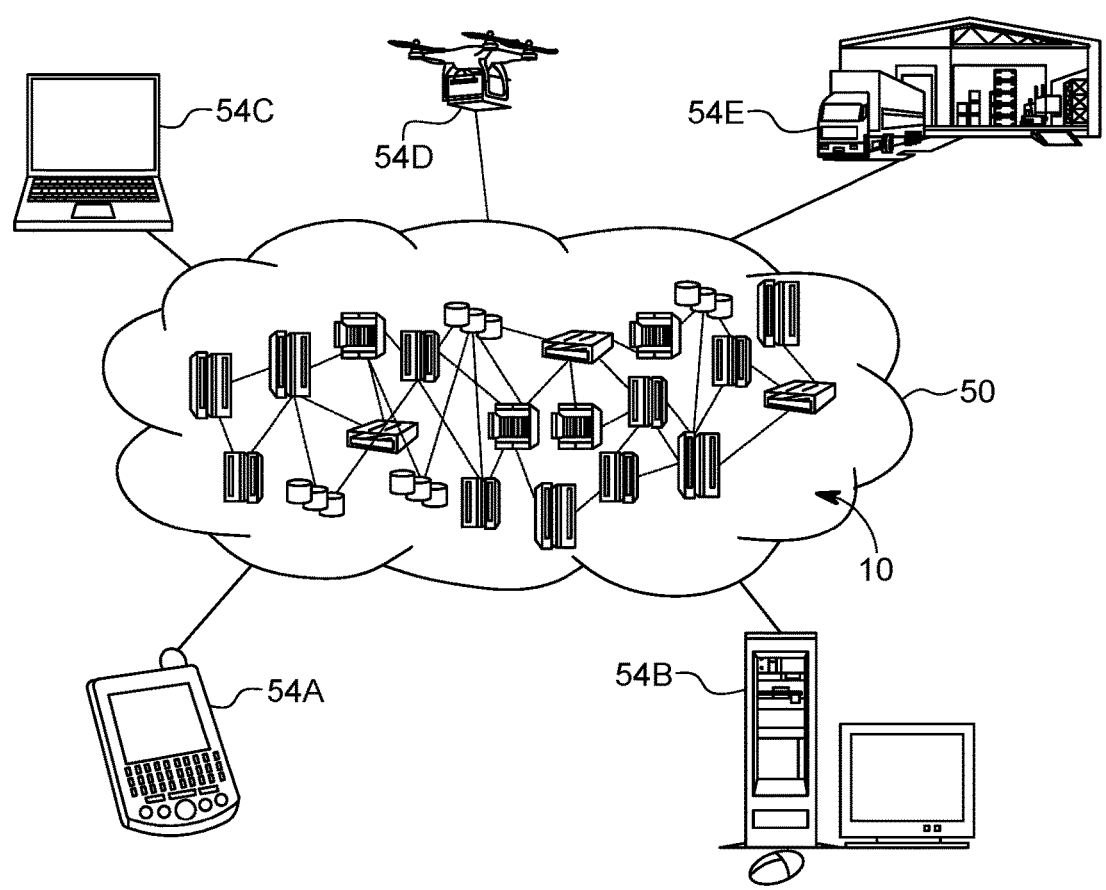
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, and/or laptop computer 54C, and delivery computer systems, such as, for example, those in drones 54D and/or warehouse(s) (or origination points for deliveries) 54E, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-E shown in FIG. 2 are intended to be illustrative only and that computing nodes 10 and cloud computing environment 50 can communicate with any type of computerized device over any type of network and/or network addressable connection (e.g., using a web browser).

Figure 3:
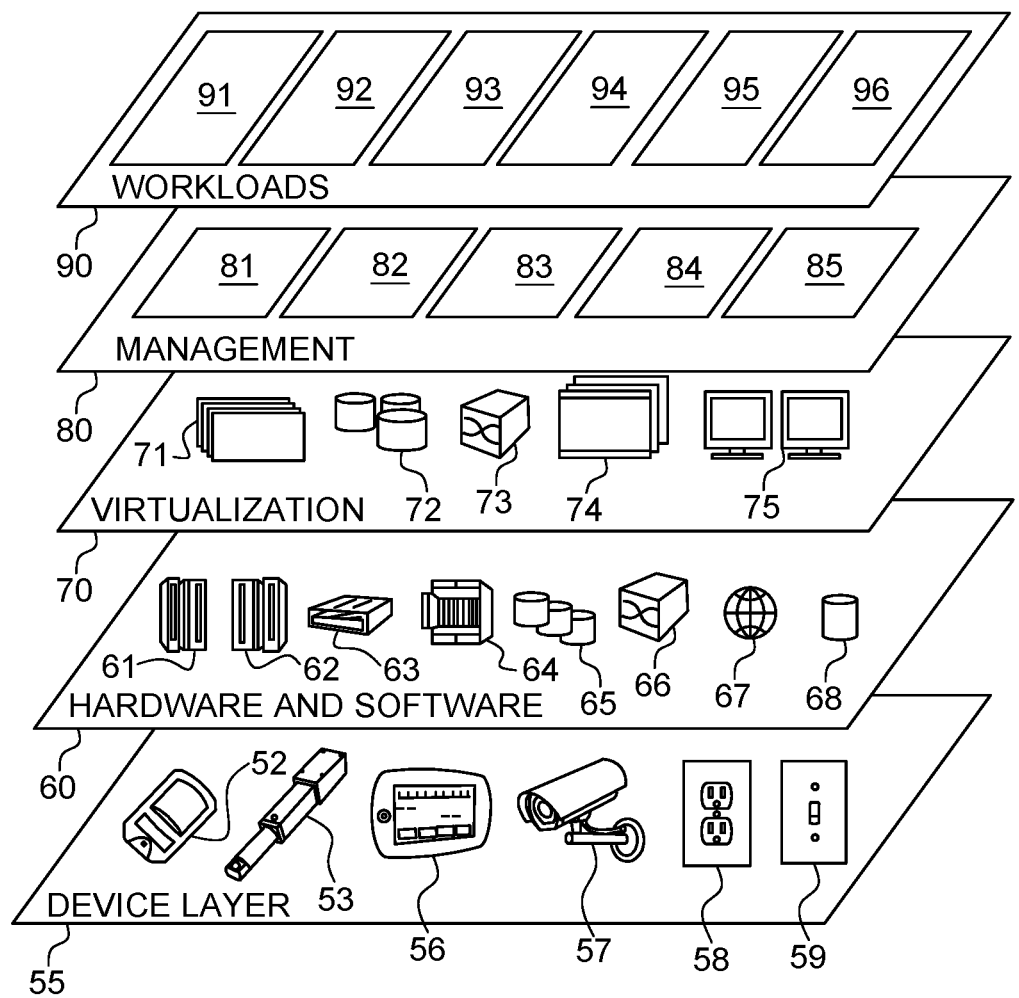
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to drones (e.g., UAVs and unmanned ground vehicles (UGVs)), and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing and controlling drones while transporting items. One of ordinary skill in the art will appreciate that the workloads and functions 96 for managing and controlling drones while transporting items may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for managing drones, such as for the transporting of items (e.g., delivering of products to customers, shipping an item from one private entity to another, etc.). The methods and systems include a data collection aspect, where a variety of information (e.g., customer-associated information) may be collected about customers (and/or potential customers) in, for example, a particular geographic region after orders for products have been received. The information may include an address (e.g., as an origination point or a delivery point) for each customer who has placed an order for a product that is to be delivered using the methods and systems described herein. However, it should be noted that in some embodiments, the various delivery points are not associated with customer orders per se. Rather, the delivery points may simply indicate the locations to which various products (or items) are to be delivered, regardless of any business transaction taking place (e.g., the mailing/shipping of an item, such as a gift, from one person to another). Additionally, the information may include, for example, the current date/season and weather data (e.g., temperature, chance of participation, etc.) associated with the region(s) in which the deliveries are to take place.

After arrangements have been made for an item to be shipped to a delivery point (or destination) (e.g., by a customer placing the order via the internet on a PDA, cellular telephone, desktop computer, etc.), the item(s) (e.g., products or goods) is loaded onto a drone (e.g., UAV) at, for example, an origination point (e.g., a warehouse). In some embodiments, the item is loaded onto (or coupled to) the drone manually. However, in some embodiments, the item is loaded onto the drone in an automated manner (e.g., the drone is controlled to pick up the item).

Figure 4:
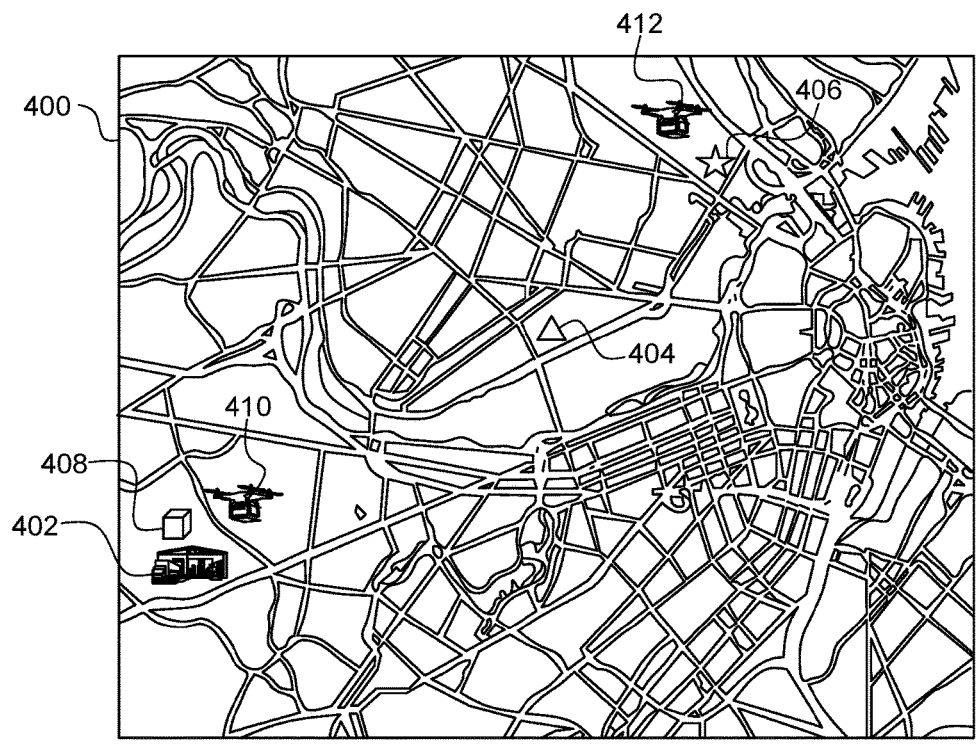
FIGS. 4-9 are plan views of a map illustrating an item being transported from an origination point to a delivery point in accordance with aspects of the present invention.

Referring to FIG. 4, a map 400 of a particular geographic region is shown. On the map 400, the location of an origination point (or first location) (e.g., a warehouse) 402, an intermediate point (handoff location or second location) 404, and a delivery point (or destination or third location) 406 are indicated, along with the locations of an item (or payload) 408, a first drone 410, and a second drone 412. In the depicted embodiment, the first drone 410 and the second drone 412 are aerial drones (e.g., UAVs). As shown in FIG. 4, the item 408 is initially located near the origination point 402. In some embodiments, the item 408 is positioned in a "pick up" zone where it is automatically retrieved by the first drone 410. However, in other embodiments, the item 408 may be manually loaded onto or coupled to the first drone 410. In the embodiment shown in FIG. 4, the first drone 410 is located (e.g., housed or stored) near the origination point 402, and the second drone is located near the delivery point 406. However, it should be understood that the drones 410 and 412 may initially be located at any appropriate location (e.g., the drones 410 and 412 may not be associated with the origination point and/or the delivery point).

Figure 5:
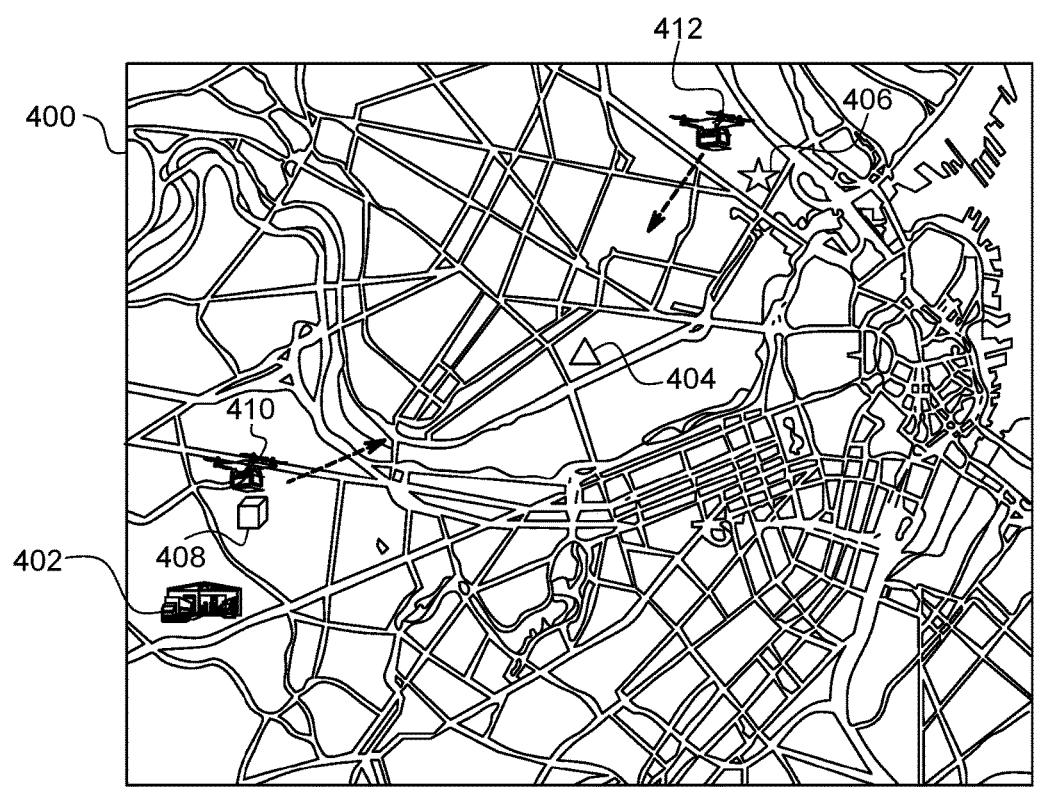
Figure 6:
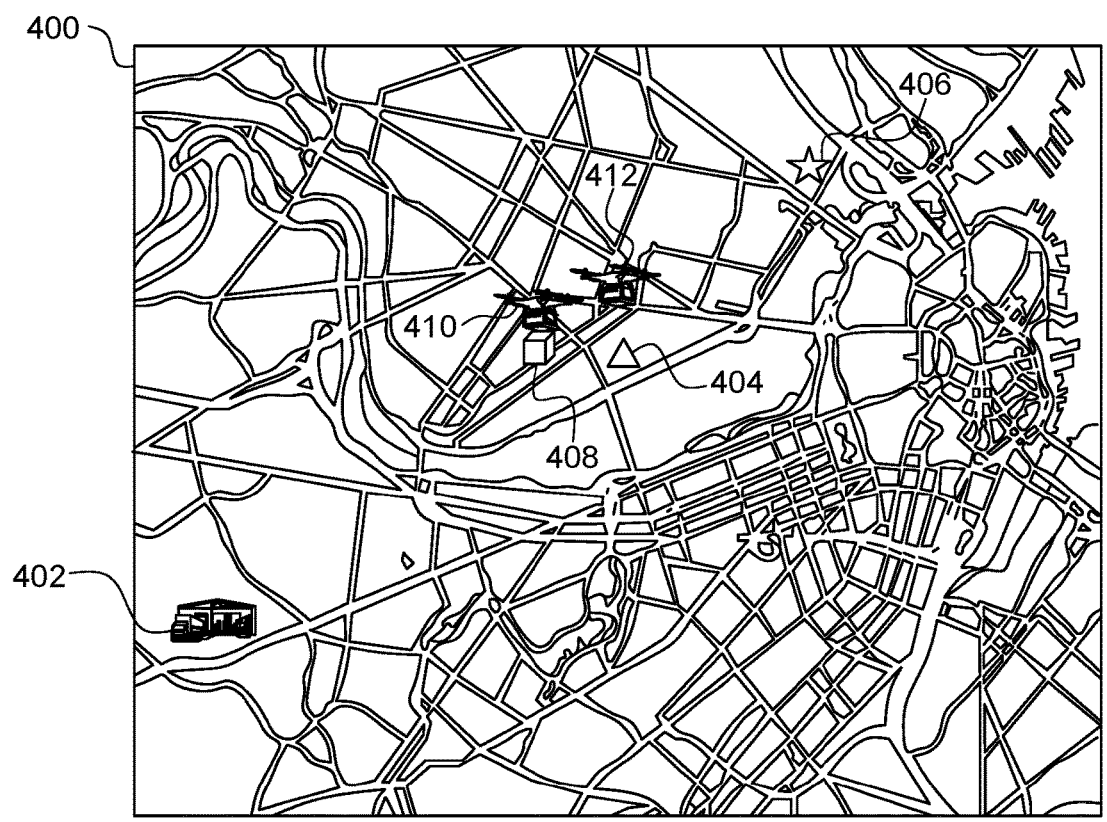

Referring to FIG. 5, after the item 408 is coupled to (or loaded onto) the first drone 410, the first drone 410 begins to travel towards the intermediate point 404 (e.g., the first drone 410 transports the item 408 to the intermediate point 404). In some embodiments, the second drone 412 begins to travel towards the intermediate point 404 before the first drone 410 arrives at the intermediate point 404. As shown in FIG. 6, the first drone 410 and the second drone 412 "meet" at (or near) the intermediate point 404. It should be understood that the location of the intermediate point 404 may be selected based on, for example, various characteristics of the drones 410 and 412 (e.g., range, payload capacity, etc.), the size, weight, etc. of the item(s) being transported, the availability of drones in the area, etc.

Figure 7:
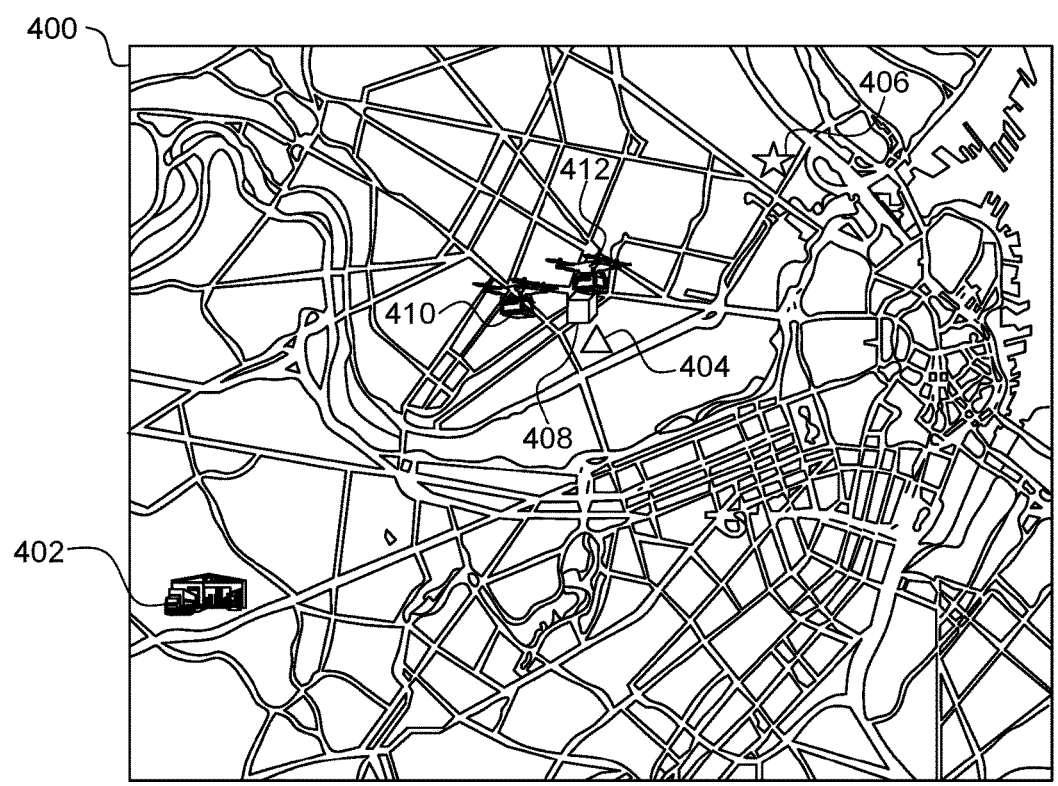

Referring now to FIG. 7, the item 408 is then transferred (or "handed off") from the first drone 410 to the second drone 412, as is described in greater detail below, at or near the intermediate point 404. In some embodiments, the item 408 is transferred from the first drone 410 to the second drone 412 "in flight" (e.g., without the item 408, the first drone 410, and the second drone 412 coming into contact with the ground or any ground-based structures).

Figure 8:
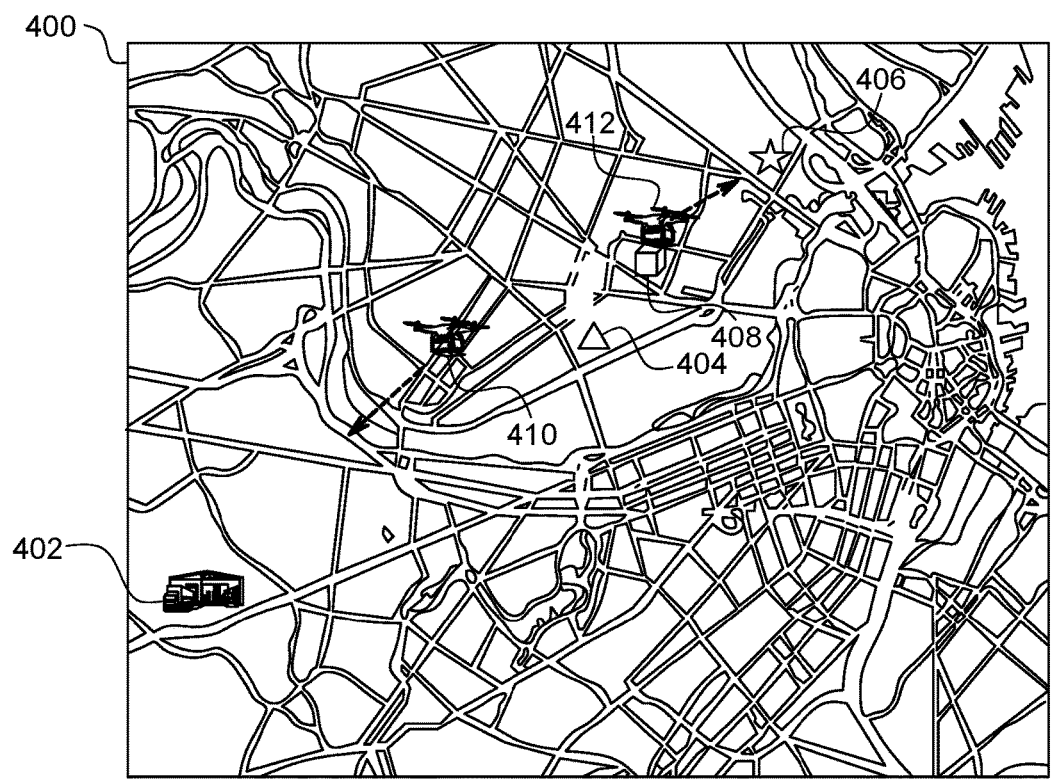

As shown in FIG. 8, after the item 408 is transferred to the second drone 412, the second drone 412 travels towards the delivery point 406, and in the embodiment shown, the first drone 410 travels back towards the origination point 402 without the item 408. However, it should be understood that in some embodiments, the first drone 410 may be used to transport another item (not shown) to the origination point 402 (or any other location). For example, in embodiments utilizing additional drones (not shown), an additional item may be transferred to the first drone 410 near the intermediate point 404 (or any other location) in the same manner item 408 was transferred from the first drone 410 to the second drone 412.

Figure 9:
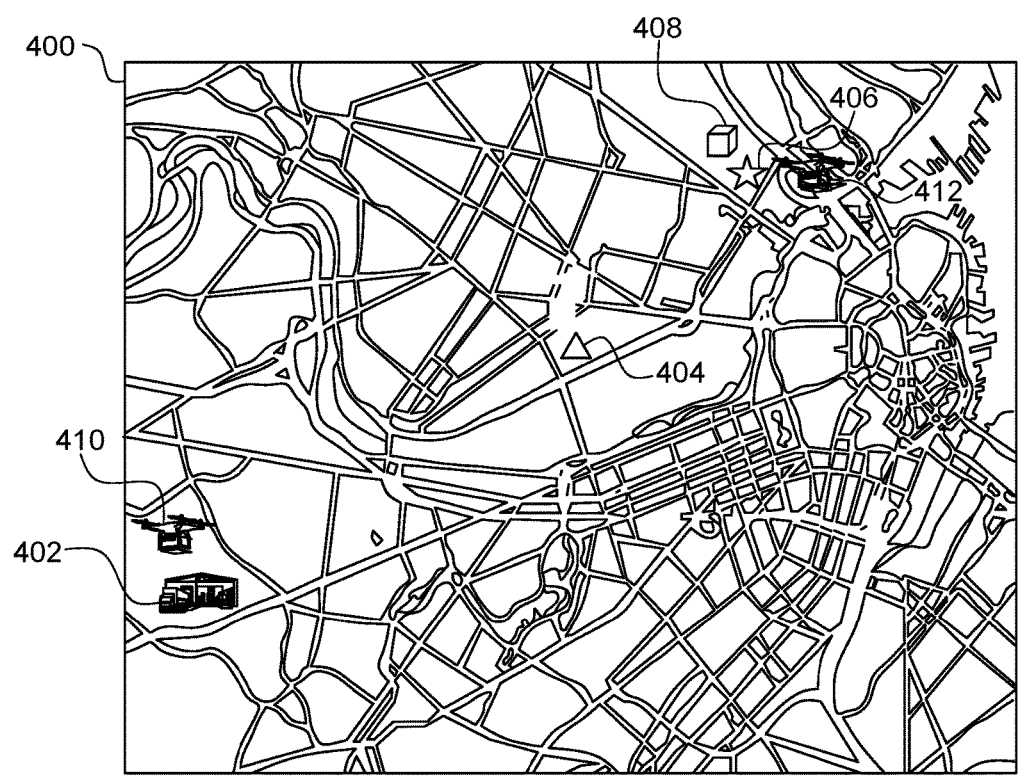

Referring to FIG. 9, the second drone 412 then drops off (or delivers) the item 408 at (or near) the delivery point 406. In some embodiments, the second drone 412 leaves the item 408 at a designated "drop zone" (e.g., on a back porch, driveway, etc.) where it is appropriately retrieved (e.g., by the customer). In the depicted embodiment, the first drone 410 has returned to the origination point 402. However, as referred to above, in other embodiments, the first drone 410 may be otherwise utilized.

Figure 10:
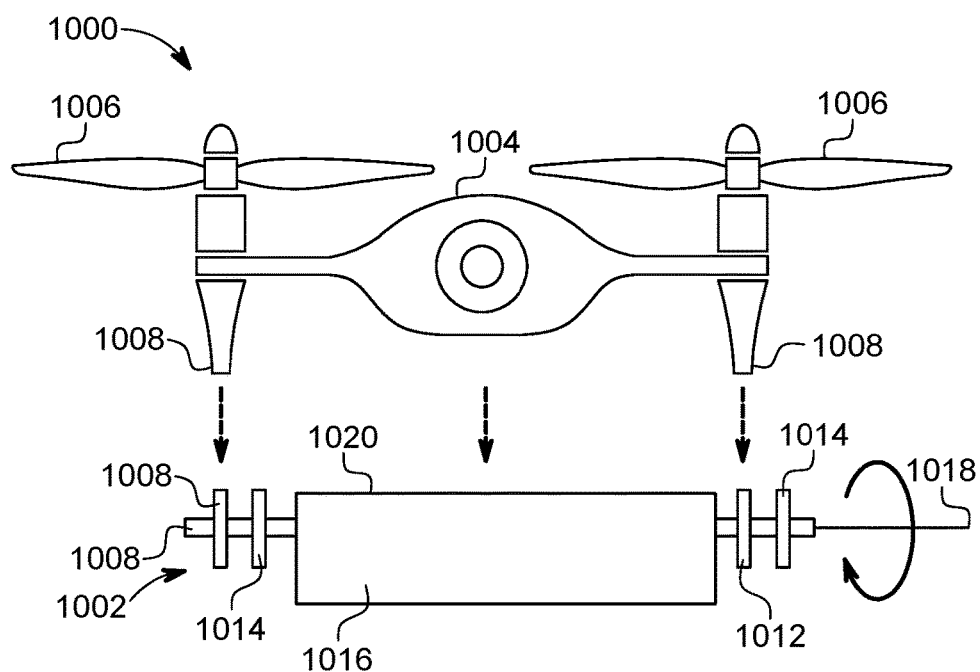
FIGS. 10-12 are side views of a drone and a payload mechanism according to an embodiment of the present invention.

FIG. 10 is a simplified illustration of a drone 1000 and a payload mechanism 1002 according to some embodiments of the present invention. In the depicted embodiment, the drone 1000 is a UAV and includes a fuselage (or frame) 1004, rotors 1006, and landing (and/or payload) supports 1008. As is shown, in the depicted embodiment, the fuselage 1004 is located at a central portion of the drone 1000, and although not shown in detail, may include (e.g., in an interior compartment), for example, a computing device (e.g., to control the flight of the drone, attach a payload, release a payload, etc.), a transceiver, and a power supply (e.g., a battery). Additionally, the fuselage 1004 (and/or another component of the drone 1000) may include one or more sensors, such as cameras, that may be used to properly align the drone 1000 with other drones and/or payloads (or items) coupled to other drones such that the drone 1000 can be attached to other drones/payloads during flight, as described below.

Although only shown from the side, in some embodiments, the drone 1000 includes four rotors 1006 (e.g., the drone 1000 is a quad-copter), which are, for example, connected to the fuselage and spaced in pairs on opposing sides of the fuselage 1004 in a substantially rectangular configuration. However, it should be understood that the drone 1000 shown in FIG. 10 is just an example of the type and shape of drone that may be used in the systems and methods described herein. Other suitable drones may have different propulsion systems and shapes (e.g., hexagonal, circular, etc.).

Although not shown in detail, each of the rotors 1006 may include a propeller and an actuator (e.g., an electric motor) configured to cause the propeller to rotate in a manner suitable to create sufficient lift to cause the drone 1000 to fly. Further, in some embodiments, each of the rotors 1006 may be configured to rotate or tilt about one or more axis to enhance the flight and/or flight control of the drone 1000. Some of the rotors 1006 may be configured such that the respective propeller is rotated in a first direction (e.g., clockwise), while some may be configured such that the propeller is rotated in a second direction (e.g., counterclockwise). Alternatively, the rotors 1006 may be configured to selectively rotate the propellers in both directions. In at least some embodiments, the rotors 1006 provide the drone 1000 with the capability of performing various in-flight rotations (e.g., about non-vertical axes) and flying in an inverted orientation (i.e., upside down).

The landing (and/or payload) supports 1008 extend below the fuselage 1004 of the drone 1000 and may be used to support the drone 1000 when the drone 1000 is not in flight (i.e., landing gear). Again, although the drone 1000 is only shown from the side, it should be understood that the drone 1000 may include more than two landing supports 1008. For example, the drone 1000 may include one landing support for each rotor 1006. However, in some embodiments, the additional landing supports 1008 may be included. Although not shown in detail, the landing supports 1008 may include mechanisms that are configured to detachably couple a payload (such as that described below) to the drone 1000 (or vice versa) using, for example, magnetic coupling (e.g., permanent magnets, electromagnets, etc.) and/or mechanical apparatuses (e.g., clamps, straps, etc.).

Still referring to FIG. 10, in the depicted embodiment, the payload mechanism (or harness) 1002 includes a shaft (or frame) 1010, two sets of attachment points (or adapters) 1012 and 1014, and a payload (or payload compartment) 1016. In some embodiments, although not shown in detail, the shaft 1010 is an elongate member with, for example, a substantially circular cross-section (e.g., a metal or polymer rod).

The attachment points (or members) 1012 and 1014 are connected to the shaft 1010 near the ends thereof in a staggered manner. More specifically, in the embodiment shown in FIG. 10, one of the attachment points in the first set 1012 and one of the attachment points in the second set 1014 are connected to the shaft 1010 near a first end thereof, while the other two are connected to the shaft 1010 near the other end thereof, with one of the points in the second set 1014 being positioned between the two points in the first set 1012, and vice versa. It should be noted that the distance between the two attachment points in each set is approximately the same as the distance between the landing supports 1008 on the drone 1000, as is evident in FIG. 10.

In the example shown, the payload 1016 is coupled to the shaft 1010 at a central portion thereof. In some embodiments, the payload 1016 is rotatably coupled to the shaft in, for example, such a way that the payload 1016 freely "spins" on the shaft 1010 about an axis (or payload axis) 1018. As is evident in FIG. 10, in some embodiments, the payload 1016 is coupled to the shaft 1010 in an "offset" manner. More specifically, as shown in FIG. 10, the center of mass of the payload 1016 is positioned below the shaft 1010 and/or axis 1018. As such, in some embodiments, when the shaft 1010 and/or the payload mechanism 1002 is rotated about an axis that is not orthogonal (or perpendicular) to axis 1018, the payload 1016 rotates about the shaft 1010 and/or axis 1018 such that an upper surface 1020 of the payload 1016 continues to face substantially "upwards" (e.g., due to the force of gravity).

It should be noted that in some embodiments, the payload 1016 is (or includes) a compartment in which items being transported by the drone(s) 1000 may be stored. However, the payload 1016 may also simply be an item being transported that is connected to the shaft 1010 in a suitable manner (e.g., using hooks, straps, etc.).

Figure 11:
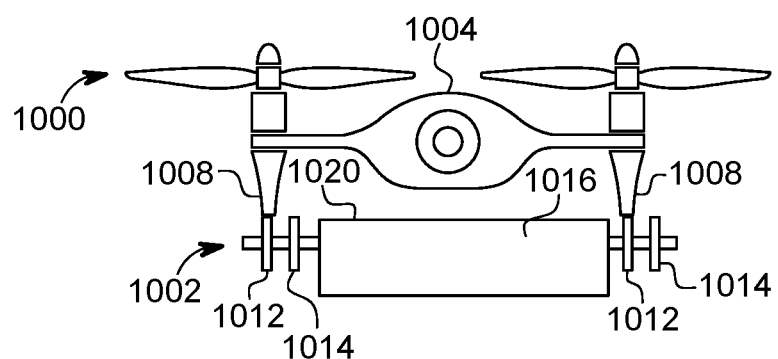

Referring now to FIG. 11 in combination with FIG. 10, in some embodiments, the payload 1002 is coupled to the drone 1000 using the attachment points 1012 and 1014 on the payload 1002 and the landing supports 1008 on the drone 1000. More specifically, each of the attachment points in one set of attachments points 1012 and 1014 is coupled to a respective one of the landing supports (e.g., via magnetic and/or mechanical forces). In the example shown in FIGS. 10 and 11, the first set of attachment points 1012 is used to couple the payload 1002 to the drone 1000, while the second set of attachment points 1014 are not being utilized.

Figure 12:
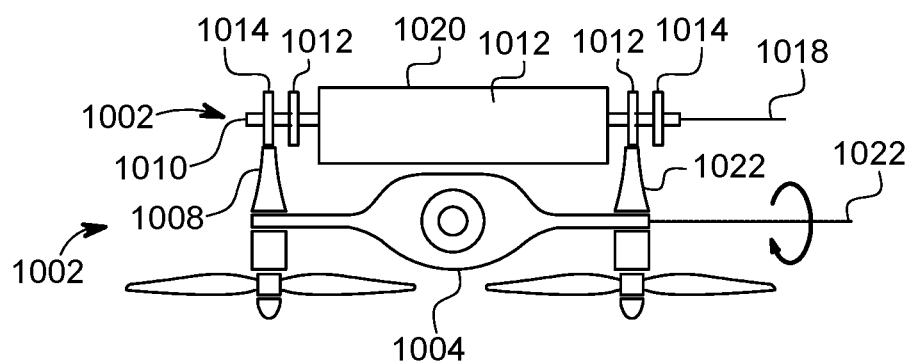

FIG. 12 illustrates the drone 1000 and payload mechanism 1002 of FIG. 11 after the drone 1000 has rotated (e.g., in flight) about, for example, a rotation axis 1022. In particular, the drone 1000 has rotated about 180 degrees such that the drone 1000 is flying in an inverted manner.

Because the payload 1016 is rotatably coupled to the shaft 1010 and the center of mass of the payload 1016 is offset from the shaft (and/or axis 1018), the payload 1016 has rotated about axis 1018 such that the upper surface 1020 thereof remains facing upwards. As such, in embodiments in which the payload 1016 includes a compartment for storing items, those items have not been rotated (e.g., inverted), but rather may remain "right side up." It should be noted that in some embodiments the axis about which the drone 1000 rotates (i.e., rotation axis 1022) is substantially parallel to the axis about which the payload 1016 rotates about the shaft 1010 of the payload mechanism 1002 (i.e., axis 1018).

It should also be noted that in at least some embodiments, the various components of the system (e.g., the payload 1016 and/or the attachment points 1012 and 1014 of the payload mechanism 1002 and/or the landing supports 1008 and/or the fuselage 1004 of the drone 1000) are sized and shaped such that the payload 1016 does not contact the fuselage 1004 and/or any other portion of the drone 1000 when the drone 1000 performs a rotation. Rather, the payload 1016 may freely rotate about the shaft 1010 of the payload mechanism 1002.

FIGS. 13-19 illustrate an item (e.g., payload 1002) being transferred (or handed off) from a first drone 1000 (e.g., the drone 1000 described above) to a second drone 1300 in accordance with some aspects of the present invention. The method shown in FIGS. 13-19 may be used in the transporting/delivering items, such as method described above with respect to FIGS. 4-9 (e.g., the handoff process that is performed at or near intermediate point 404 in FIGS. 7 and 8).

Figure 13:
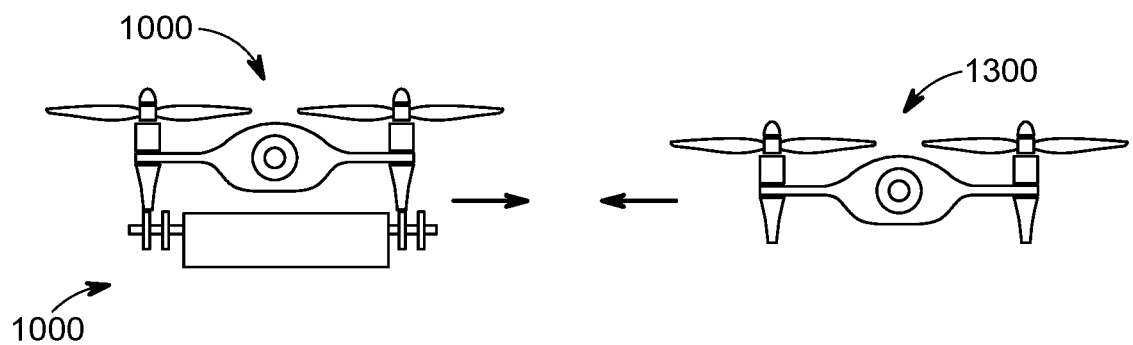
FIGS. 13-19 are side views of the drone and payload mechanism of FIGS. 10-12 illustrating the payload mechanism being transferred to a second drone in accordance with aspects of the present invention.
Figure 14:
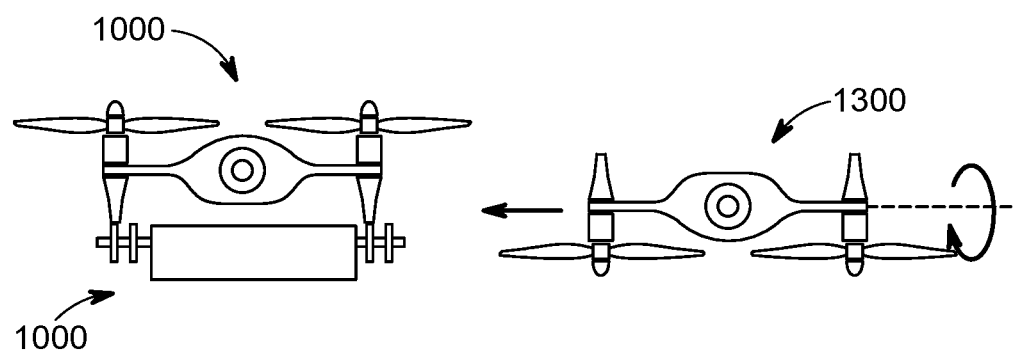

As shown in FIG. 13, the first drone 1000, with the payload 1002 coupled thereto, and the second drone 1300 approach each other in preparation for the handoff process. Although not shown in detail, it should be understood that the second drone 1300 may be substantially identical to the first drone 1000. In some embodiments, when the drones 1000 and 1300 get within a predetermined distance of each other, the first drone 1000 begins to hover in place, and the second drone 1300 performs an in-flight rotation (e.g., about 180 degrees) about, for example, a substantially horizontal axis such that the second drone 1300 is flying in an inverted orientation, as shown in FIG. 14.

Figure 15:
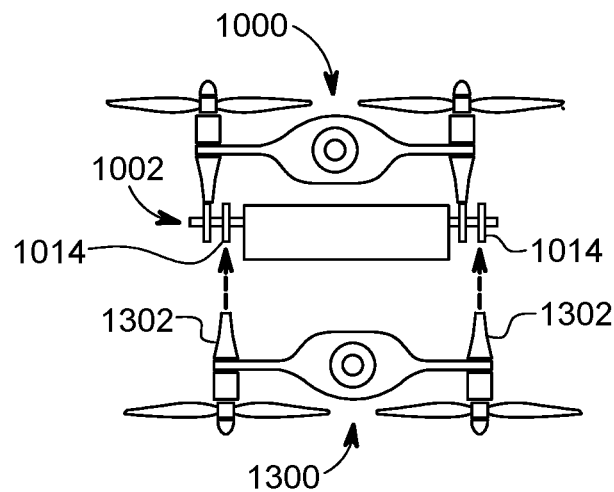

As shown in FIG. 15, the second drone 1300 then maneuvers to a position below the first drone 1000 (and/or the payload 1002) (and/or the first drone 1000 maneuvers to a position above the second drone 1300). In particular, as shown, the second drone 1300 is positioned relative to the first drone 1000 and the payload 1002 such that landing supports 1302 on the second drone 1300 are aligned with the second set of attachment points 1014 on the payload 1002.

Figure 16:
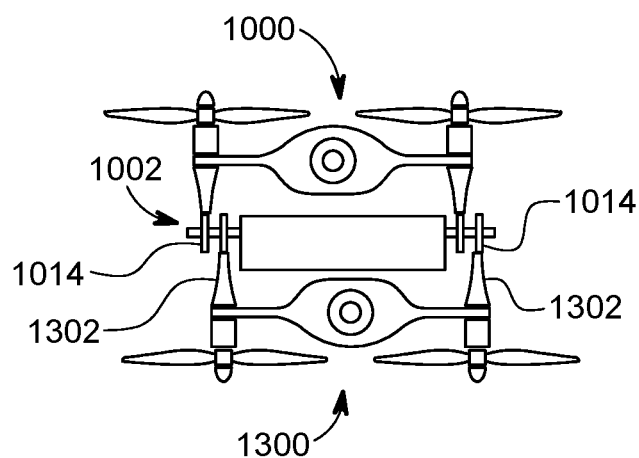

Referring to FIG. 16 in combination with FIG. 15, the second drone 1300 then couples to the payload 1002 (or vice versa). More specifically, in some embodiments, the second drone 1300 couples to the payload 1002 while the payload 1002 is still coupled to the first drone 1000. In particular, in the embodiment shown, the second drone 1300 couples to the second set of attachment points 1014 on the payload 1002 using its landing supports 1302. As such, as shown in FIG. 16, the payload 1002 is then simultaneously coupled to the first drone 1000, using the first set of attachment points 1012 on the payload 1002 (as described above and specifically shown in FIGS. 11 and 12), and the second drone 1300, using the second set of attachment points 1014 on the payload 1002.

Figure 17:
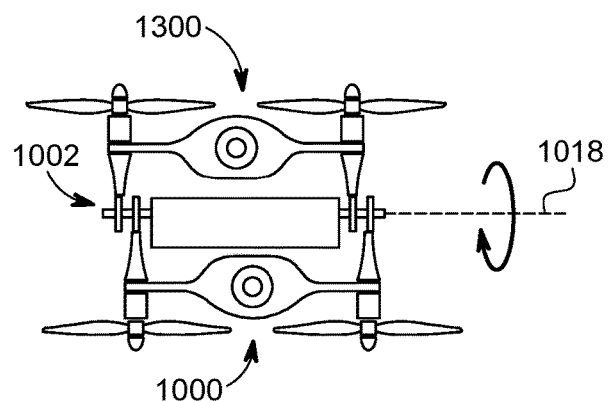

As shown in FIG. 17, in some embodiments, with the payload 1002 coupled to both the first drone 1000 and the second drone 1300, the first drone 1000 and the second drone 1300 simultaneously perform an in-flight rotation about a non-vertical axis so that the second drone 1300 is positioned above the payload mechanism 1002, in an upright orientation, and the first drone 1000 is positioned below the payload mechanism 1002, in an inverted orientation. In the example shown, the in-flight rotation is performed about a horizontal axis (e.g., the payload axis 1018). As a result, the first drone 1000 and the second drone 1300 have essentially swapped positions relative to the payload mechanism 1002. It should be noted that, as described above, in some embodiments, the payload 1016 of the payload mechanism 1002 has rotated about the shaft 1010 of the payload mechanism 1002 such that the upper surface 1020 thereof remains facing upwards (FIG. 12). In other words, during the in-flight rotation shown in FIG. 17, the payload 1016 (FIG. 12) does not rotate with the first drone 1000 and the second drone 1300 but rather remains in an upright orientation.

Figure 18:
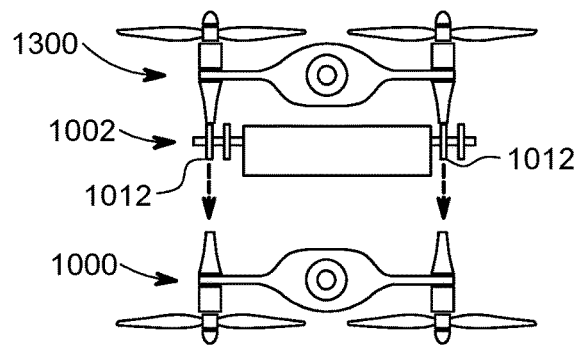

Referring now to FIG. 18, the first drone 1000 then detaches from the payload mechanism 1002. In particular, the first drone 1000 releases the first set of attachment points 1012 on the payload mechanism 1002, resulting in the payload mechanism 1002 then being solely supported by (and coupled to) the second drone 1300. As such, the payload mechanism 1002 (and any items therein/coupled thereto) has been transferred, or handed off, from the first drone 1000 to the second drone 1300.

Figure 19:
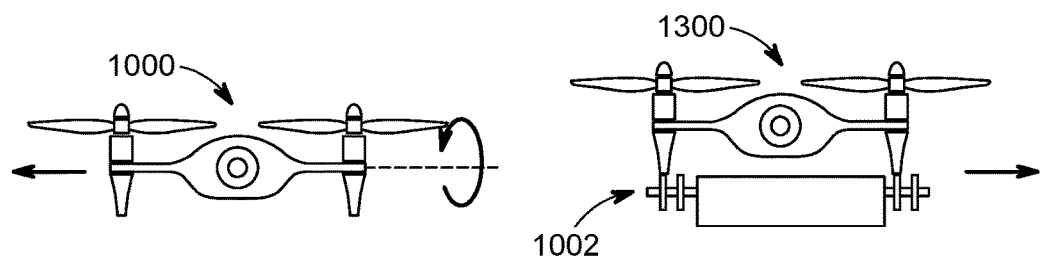

As shown in FIG. 19, the second drone 1300 may then transport the payload mechanism 1002 away from the location at which the handoff process was performed (e.g., to be delivered or to the next handoff point). The first drone 1000 may similarly travel away from the location to, for example, return to the location where it is housed, take part in another payload handoff process, be otherwise utilized, etc. As shown, after the first drone 1000 has detached from the payload mechanism 1002, the first drone 1000 may perform another in-flight rotation to return to the upright orientation.

Figure 20:
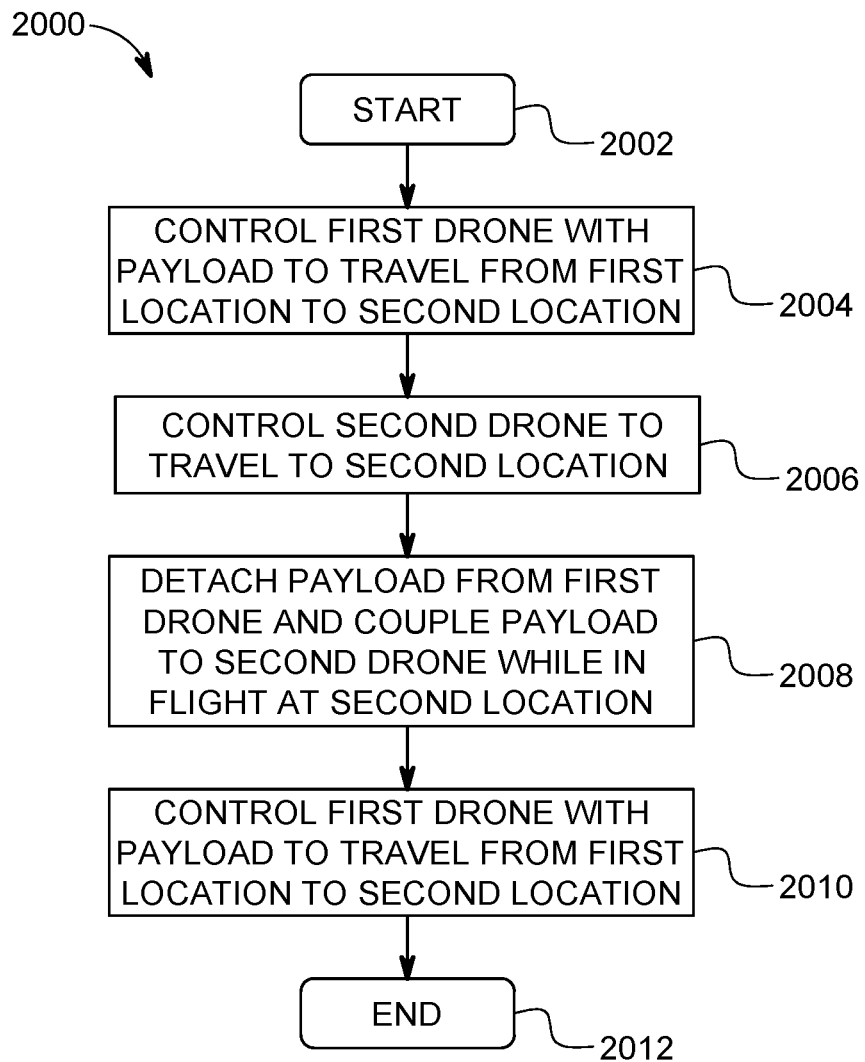
FIG. 20 is a flowchart diagram depicting an exemplary method for managing drones in which various aspects of the present invention may be implemented.

Turning to FIG. 20, a flowchart diagram of an exemplary method 2000 for managing drones (e.g., to deliver products to customers or otherwise transport items), in accordance with various aspects of the present invention, is illustrated. Method 2000 begins (step 2002) with, for example, one or more items, or more generally, a payload, being selected for transport from an origination point (or first location) to a delivery point (e.g., a product being ordered and selected for delivery from a warehouse to the customer address, being shipped from one location to another, etc.) and loaded onto, or coupled to, a first drone (e.g., UAV). In some embodiments, the payload is loaded onto/coupled to the first drone using a payload mechanism such as those described above.

The first drone is controlled such that the first drone, along with the payload, travels (e.g., flies) from the first location to a second location (or intermediate point or handoff point) (step 2004). A second drone (e.g., substantially identical to the first drone) is controlled such that the second drone travels to the second location (step 2006).

The payload is detached from the first drone and coupled to the second drone while the first drone and the second drone are in-flight at the second location (step 2008). In other words, in some embodiments, the payload is transferred, or handed off, to the second drone in flight, as opposed to either of the drones and/or the payload coming into contact with the ground or any ground-based structures. In some embodiments, the payload is coupled to the second drone before the payload is detached from the first drone. The process of transferring the payload from the first drone to the second drone may include at least one of the drones performing an in-flight rotation about, for example, a non-vertical axis (e.g., a horizontal axis).

After the payload is detached from the first drone and coupled to the second drone, the second drone is controlled to travel from the second location to a third location (step 2010). In some embodiments, the third location corresponds to a delivery point (e.g., a ground-based location). However, it should be understood that in some embodiments, the third location may correspond to the location of another in-flight handoff process (i.e., to transfer the payload to a subsequent drone).

Method 2000 ends (step 2012) with, for example, the payload being delivered or transferred to a subsequent drone at the third location (e.g., using a similar handoff process used to transfer the payload from the first drone to the second drone). As such, it should be understood that method 2000 may include additional steps (e.g., additional handoff processes, deliveries, etc.)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method, by one or more processors, for managing drones, comprising:
   controlling a first aerial drone having a payload coupled thereto such that the first aerial drone travels from a first location to a second location;
   controlling a second aerial drone such that the second aerial drone travels to the second location;
   while the first aerial drone and the second aerial drone are in flight at the second location, enabling the payload to be detached from the first aerial drone and coupled to the second aerial drone; wherein the first aerial drone and the second aerial drone do not make physical contact prior to transferring the payload; and
   after the payload is detached from the first aerial drone and while the payload is coupled to the second aerial drone, controlling the second aerial drone such that the second aerial drone travels from the second location to a third location.

2. The method of claim 1, wherein the payload is coupled to the second aerial drone before the payload is detached from the first aerial drone.

3. The method of claim 1, further including controlling at least one of the first aerial drone and the second aerial drone such that the at least one of the first aerial drone and the second aerial drone performs at least one in-flight rotation about a non-vertical axis.

4. The method of claim 3, wherein when the payload is coupled to at least one of the first aerial drone and the second aerial drone, at least a portion of the payload is rotatable relative to the at least one of the first aerial drone and the second aerial drone about a payload axis, wherein the payload axis is not orthogonal to the non-vertical axis.

5. The method of claim 3, wherein the controlling of the at least one of the first aerial drone and the second aerial drone such that the at least one of the first aerial drone and the second aerial drone performs at least one in-flight rotation about a non-vertical axis includes:
   controlling the second aerial drone such that the second aerial drone performs a first in-flight rotation before the payload is coupled to the second aerial drone; and
   controlling the first aerial drone and the second aerial drone such that the first aerial drone and the second aerial drone simultaneously perform a second in-flight rotation after the payload is coupled to the second aerial drone and before the payload is detached from the first aerial drone.

6. The method of claim 5, wherein the controlling of the at least one of the first aerial drone and the second aerial drone such that the at least one of the first aerial drone and the second aerial drone performs at least one in-flight rotation about a non-vertical axis further includes controlling the first aerial drone such that the first aerial drone performs a third in-flight rotation after the payload is detached from the first drone.

7. The method of claim 1, further including enabling the payload to be detached from the second aerial drone at the third location.

8. A system for managing drones, comprising:
at least one processor that
controls the first aerial drone having a payload coupled thereto such that the first aerial drone travels from a first location to a second location;
controls a second aerial drone such that the second aerial drone travels to the second location;
while the first aerial drone and the second aerial drone are in flight at the second location, enables the payload to be detached from the first aerial drone and coupled to the second aerial drone; wherein the first aerial drone and the second aerial drone do not make physical contact prior to transferring the payload; and
after the payload is detached from the first aerial drone and while the payload is coupled to the second aerial drone, controls the second aerial drone such that the second aerial drone travels from the second location to a third location.

9. The system of claim 8, wherein the payload is coupled to the second aerial drone before the payload is detached from the first aerial drone.

10. The system of claim 8, wherein the processor controls at least one of the first aerial drone and the second aerial drone such that the at least one of the first aerial drone and the second aerial drone performs at least one in-flight rotation about a non-vertical axis.

11. The system of claim 10, wherein when the payload is coupled to at least one of the first aerial drone and the second aerial drone, at least a portion of the payload is rotatable relative to the at least one of the first aerial drone and the second aerial drone about a payload axis, wherein the payload axis is not orthogonal to the non-vertical axis.

12. The system of claim 10, wherein the controlling of the at least one of the first aerial drone and the second aerial drone such that the at least one of the first aerial drone and the second aerial drone performs at least one in-flight rotation about a non-vertical axis includes:
controlling the second aerial drone such that the second aerial drone performs a first in-flight rotation before the payload is coupled to the second aerial drone; and
controlling the first aerial drone and the second aerial drone such that the first aerial drone and the second aerial drone simultaneously perform a second in-flight rotation after the payload is coupled to the second aerial drone and before the payload is detached from the first aerial drone.

13. The system of claim 12, wherein the controlling of the at least one of the first aerial drone and the second aerial drone such that the at least one of the first aerial drone and the second aerial drone performs at least one in-flight rotation about a non-vertical axis further includes controlling the first aerial drone such that the first aerial drone performs a third in-flight rotation after the payload is detached from the first drone.

14. The system of claim 8, wherein the processor further enables the payload to be detached from the second aerial drone at the third location.

15. A computer program product for managing drones by one or more processors, the computer program product comprising a non-transitory computer-readable storage medium having computer-readable program code portions stored therein, the computer-readable program code portions comprising:
an executable portion that controls the first aerial drone having a payload coupled thereto such that the first aerial drone travels from a first location to a second location;
an executable portion that controls a second aerial drone such that the second aerial drone travels to the second location;
an executable portion that, while the first aerial drone and the second aerial drone are in flight at the second location, enables the payload to be detached from the first aerial drone and coupled to the second aerial drone; wherein the first aerial drone and the second aerial drone do not make physical contact prior to transferring the payload; and
an executable portion that, after the payload is detached from the first aerial drone and while the payload is coupled to the second aerial drone, controls the second aerial drone such that the second aerial drone travels from the second location to a third location.

16. The computer program product of claim 15, wherein the payload is coupled to the second aerial drone before the payload is detached from the first aerial drone.

17. The computer program product of claim 15, wherein the computer-readable program code portions further include an executable portion that controls at least one of the first aerial drone and the second aerial drone such that the at least one of the first aerial drone and the second aerial drone performs at least one in-flight rotation about a non-vertical axis.

18. The computer program product of claim 17, wherein when the payload is coupled to at least one of the first aerial drone and the second aerial drone, at least a portion of the payload is rotatable relative to the at least one of the first aerial drone and the second aerial drone about a payload axis, wherein the payload axis is not orthogonal to the non-vertical axis.

19. The computer program product of claim 17, wherein the controlling of the at least one of the first aerial drone and the second aerial drone such that the at least one of the first aerial drone and the second aerial drone performs at least one in-flight rotation about a non-vertical axis includes:
controlling the second aerial drone such that the second aerial drone performs a first in-flight rotation before the payload is coupled to the second aerial drone; and
controlling the first aerial drone and the second aerial drone such that the first aerial drone and the second aerial drone simultaneously perform a second in-flight rotation after the payload is coupled to the second aerial drone and before the payload is detached from the first aerial drone.

20. The computer program product of claim 19, wherein the controlling of the at least one of the first aerial drone and the second aerial drone such that the at least one of the first aerial drone and the second aerial drone performs at least one in-flight rotation about a non-vertical axis further includes controlling the first aerial drone such that the first aerial drone performs a third in-flight rotation after the payload is detached from the first drone.

21. The computer program product of claim 15, wherein the computer-readable program code portions further include an executable portion that enables the payload to be detached from the second aerial drone at the third location.

* * * * *